United States Patent [19]

Katbi et al.

[11] Patent Number: 4,963,061
[45] Date of Patent: Oct. 16, 1990

[54] CERAMIC CUTTING INSERT

[75] Inventors: Karl Katbi, Troy; John H. Patterson, Hazel Park; Tony M. Lowe, Royal Oak; Yefim Val, Troy; Thomas J. Bernadic, Madison Hts.; Brendan L. Brockett, Dearborn Heights, all of Mich.

[73] Assignee: GTE Valenite Corporation, Troy, Mich.

[21] Appl. No.: 334,624

[22] Filed: Apr. 7, 1989

[51] Int. Cl.⁵ .................... B23B 27/14; B23B 27/22
[52] U.S. Cl. .................... 407/114; 407/113; 407/116; 407/119
[58] Field of Search .............. 407/113, 114, 115, 116

[56] References Cited

U.S. PATENT DOCUMENTS

| | | | |
|---|---|---|---|
| 4,116,576 | 9/1978 | Gawryk, Sr. | 407/114 |
| 4,218,160 | 8/1980 | Arnold | 407/114 |
| 4,247,232 | 1/1981 | McCreery et al. | 407/114 |
| 4,681,488 | 7/1987 | Markusson | 407/114 |
| 4,755,086 | 7/1988 | Stashko | 407/114 |
| 4,787,784 | 11/1988 | Bernadic et al. | 407/114 |
| 4,856,942 | 8/1989 | Bernadic et al. | 407/114 |
| 4,859,122 | 8/1989 | Patterson et al. | 407/114 |

Primary Examiner—William E. Terrell
Assistant Examiner—Mark F. Frazier
Attorney, Agent, or Firm—Robert E. Walter

[57] ABSTRACT

In a ceramic indexable cutting insert, an edge strengthening land extends rearwardly of a beveled cutting edge at an angle of from about 80 to about 100 degrees with respect to the peripheral side surface, and a grooved recess extents rearwardly and along the edge strengthening land to direct chips upwardly and outwardly away from the insert and the cutting edge. In one embodiment of the present invention intended for conditions of heavy depth of cut, enhanced edge strength is sacrificed and an edge strengthened land is not provided.

1 Claim, 2 Drawing Sheets

CERAMIC CUTTING INSERT

FIELD OF THE INVENTION

The present invention relates to indexable ceramic cutting inserts having an improved chip breaker form.

BACKGROUND OF THE INVENTION

Indexable ceramic cutting inserts for detachable mounting on a tool holder, are generally made of alumina, alumina/zirconia, silicon nitride or other ceramic and are formed by hot pressing or cold pressing and sintering techniques.

In the past, ceramic type cutting inserts for metal cutting typically used negative type geometries to form a strong cutting edge. When cutting a particular material, the formation of an appropriate chip under various feed and speed conditions would not be optimized.

U.S. Pat. No. 4,616,963 to Habert describes a ceramic cutting tip having an encircling bevel with an adjacent channel. The channel has a cross section in the form of a segment of a circle with a chord at an angle of from 15 to 35 degrees with respect to the top surface.

SUMMARY OF THE INVENTION

It is an object of the present invention to have a combined strengthened cutting edge and efficient chip breaking action in a ceramic cutting insert.

It is a further object of the present invention to configure the chip breaker so the chip tends to flow smoothly with better direction and with less breakage of the edge.

It is a further object of the present invention to lower the cutting forces while generating less wear and achieve improved tool life.

It is an object of the present invention to obviate one or more disadvantages of the prior art.

Other and further objects of the present invention will be apparent to one of ordinary skill in the art from reading of the detailed specification.

With the ceramic insert of the present invention, the chip which is formed during cutting flows over the beveled cutting edge and across or along an edge strengthening surface followed by a descending surface portion. The flowing chip next encounters the bottom of the chip breaker groove or channel. An ascending wall directs the chip upwardly and outwardly. In the present invention, the chip form incorporates an edge strengthening land followed by a grooved recess or chip breaker.

In accordance with the present invention, a ceramic indexable cutting insert comprises a pair of substantially parallel spaced apart faces and at least one peripheral side surface being substantially normal to said faces. A beveled cutting edge lies in a plane located at or positioned closely adjacent the juncture of one of said faces and the peripheral side surface. The edge strengthening land extends rearwardly of the beveled edge at an angle of from about 80 to about 100 degrees with respect to the peripheral side surface. To break the chips formed during cutting, a grooved recess extents rearwardly and along the edge strengthening land. The grooved recess includes a shallow descending surface leading to the bottom of the chip breaker or grooved recess followed by an ascending surface. The ascending surface directs the chip upwardly toward a respective one of said parallel faces and away from the insert and the cutting edge. The lowermost position of the grooved recess, which is positioned at the juncture of the descending and ascending surfaces, is positioned rearwardly from the cutting edge a distance of from about 0.04 to about 0.08 inch. In one embodiment of the present invention intended for conditions of heavy depth of cut, enhanced edge strength is sacrificed and an edge strengthened land not provided.

DETAILED DESCRIPTION OF THE DRAWINGS

DETAILED DESCRIPTION OF THE PREFERRED EMBODIMENT

Figure 1:
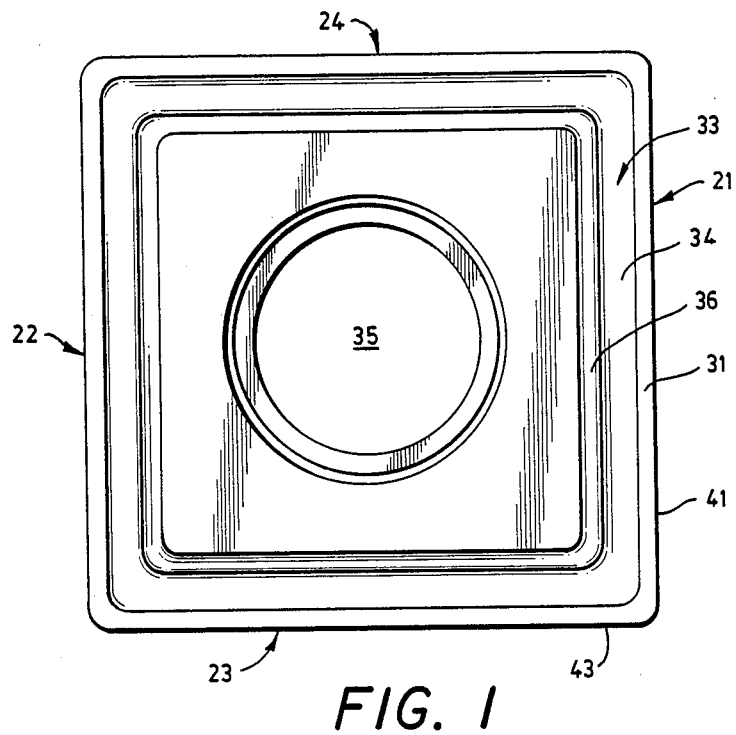
FIG. 1 is a top-elevational view of an insert of the present invention.

As shown in FIG. 1, the cutting insert 15 has a top face 17 and a bottom face 19 forming spaced parallel faces with peripheral side surfaces 21-24 positioned therebetween. The peripheral side surfaces 21-24 lie in planes that are substantially normal to the parallel faces. The peripheral side surfaces 21-24 form adjacent side surfaces which merge at the corners of the polygonal insert 15. The respective pair of opposite side surfaces 21,22 and 23,24 are substantially parallel.

Figure 2:
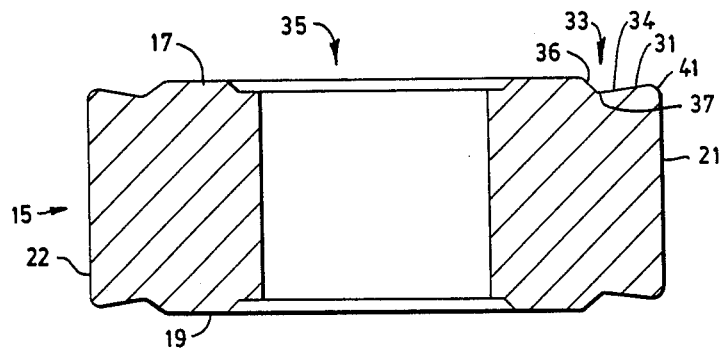
FIG. 2 is a sectional view along section 2—2 of FIG. 1.

As illustrated in FIG. 1 and FIG. 2, the chip breaker or grooved recess 33 terminates at a central island or face 17. Although a square insert 15 is shown in FIG. 1, other insert geometries are considered to be within the scope of the present invention. Typical other shapes include polygonal shapes such as diamond or rectangular or arcuate shapes such as circular. As illustrated in FIG. 2, grooved recess or chip breaker 33 comprises a descending surface 34 extending downwardly from a strengthened edge 31 and an ascending surface 34 extending upwardly from descending surface 34 to the central island 17.

For mounting purposes, the insert 15 may be provided with an opening 35 extending entirely through the insert 15 from the one face 17 to the other face 19. In the interior region, the opening 35 has straight sides extending in a direction normal to the faces 17,19. In the region adjacent a respective face, the opening bevels outwardly for accommodating the head of a threaded screw which can be used to provide secure attachment of the insert 15 to a tool. Typically ceramic inserts are mounted to a cutting tool holder with a clamp so a central opening is not necessary.

For purposes of the following discussion, inwardly or the inward direction is toward the center of the insert while outwardly or the outward direction is in a direction away from the center of the insert. With reference to chip flow over a cutting edge, the radial direction is generally perpendicular to the cutting edge while the axial direction is parallel to the cutting edge. Dimensions referred to in the specification are in inches unless otherwise specified. The various angles referred with respect to the chip breaker recess are designated with respect to a respective side surface. Since the peripheral side surface 22 is substantially normal to the plane of the face 17, the angles of the various lands with respect to the face 17 are the the respective complements of the angles that the land makes with respect to the peripheral side surface.

The chip grooves as illustrated in FIGS. 3 to 6 may be ground into RBMA-88T, 106T and SNG-643 inserts which are commercially available from GTE Valenite Corporation. The inserts are a ceramic grade known as V-32 which is an alumina oxide grade of GTE Valenite Corporation. The inserts may have a circular or polygonal shape. The RBMA-88T and 106T configurations are circular inserts having a flat face. The SNG-643 inserts are square inserts having a flat face. The chip breaker groove may be a continuous uninterrupted groove extending entirely around the insert adjacent the cutting edge or be an interrupted groove. Typical interrupted grooves include scallop type grooves such as described in U.S. Pat. No. 4,626,140 to Zweekly et al or grooves which terminate short of the corners for polygonal type inserts.

Indexable ceramic cutting inserts for detachable mounting on a tool holder, are generally made of alumina, alumina/zirconia, silicon nitride or other ceramic and are formed by hot pressing or cold pressing and sintering techniques. U.S. Pat. No. 4,330,333 to Gibbs relates to a specific cermet composition. U.S. Patent to Wei relates to a silicon carbide whisker reinforced alumina composite. Alumina and alumina stabilized with additions of zirconia are typical ceramic materials which may be used as a cutting tool. The ceramic materials may included additional phases such as whiskers or particles in the form of grains which may enhance the beneficial properties of the cutting tool. Silicon nitride may be used as a ceramic material for cutting tools. Examples of silicon nitride tools are described in U.S. Pat. Nos. 4,441,894 and 4,449,989 to Sarin et al. It is considered that ceramic tools having an exterior coating may be employed. Typically such coatings include alumina or zirconia oxide or the carbides, nitrides, or borides of the Group IVB, VB and VIB elements of the Periodic Table of Elements. The ceramic inserts may be prepared by conventional techniques which may vary depending on the particular ceramic utilized. Conventional techniques include sintering a molded ceramic, hot pressing and dicing the resulting article into inserts, and hot isostatic pressing. It is also contemplated that the chip breaker configurations of the present invention may be pressed or shaped into a ceramic powder mixture having green strength, presintered strength, and then hot isostatically pressed to result in an insert having the desired chip breaking groove so as to reduce the necessity of a chip breaker grinding step.

Continuing with a discussion of FIGS. 1 and 2, the respective merging adjacent peripheral side surfaces 21 to 24 form straight cutting edges which substantially lie in the same cutting plane. Two of the cutting edges which are shown in FIG. 1 at 41 and 43 are associated with respective peripheral side surfaces 21 and 23. The remaining cutting edges are similarly associated with respective remaining peripheral side surfaces. The cutting plane either corresponds to the top face 17 or lies just below the top face 17. The respective merging adjacent peripheral side surfaces 21,23 and 22,24 join to form a respective pair of rounded cutting corners 27,29 which have a radius of less than about 0.03 inch for finishing operations.

The cutting edges 41, 43 are beveled or rounded to reduce cracking when the edge impacts the work to be cut. The beveled edge preferably has a radius of from about 0.002 to about 0.005, preferably about 0.003 inch. An edge strengthening land 31 extends rearwardly of the cutting edge at an angle of from about 80 to about 100 degrees with respect to the peripheral side surface. To break the chips formed during cutting, a grooved recess 33 extents rearwardly and along the edge strengthening land 31. The grooved recess 33 includes a shallow descending surface 34 leading to the bottom of the chip breaker or grooved recess 33 followed by an ascending surface 36. The ascending surface 36 directs the chip upwardly toward a respective one of said parallel faces and away from the insert 15 and the cutting edge 41. The lowermost portion 37 of the grooved recess 33, which is positioned at the juncture of the descending and ascending surfaces, is positioned rearwardly from the cutting edge a distance of from about 0.04 to about 0.08 inch.

As illustrated in FIG. 1, the edge strengthening land 31, descending surface 34, and ascending land 36 each have a substantially uniform width preferably extending entirely around the periphery of the insert 25 and merge at the corners. However, other forms of chip breaker geometry are within the scope of the present invention, in particular, scalloped chip breakers as described in U.S. Pat. No. 4,606,678 configuration are formed by grinding the surface of an insert with a grinding wheel having an axis of rotation at an acute angle with an insert face as described thereon. The portion of the patent relating to scallop formation and construction of the insert by grinding operations is incorporated by reference into the disclosure of the present specification. Scallop chip breakers can conveniently be used in inserts having a variety of shapes including circular, rectangular, and diamond.

Figure 3:
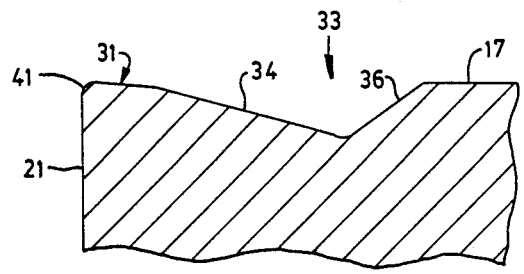
FIG. 3 is a detailed sectional view of a chip breaker similarly situated to the chip breaker shown in FIG. 2 but of a preferred embodiment.

According to a preferred embodiment illustrated in FIG. 3, the edge strengthening land extends rearwardly of the beveled edge a distance of from about 0.005 to about 0.015 inch, preferably about 0.01 inch and at an angle of from about 80 to about 86 degrees, preferably about 83 degrees, with respect to the peripheral side surface 22. The descending surface 34 extends downwardly from the strengthened edge 31 at an angle of from about 83 to about 87 degrees with respect to the respective peripheral side surface 22, more preferably at an angle of about 85 degrees. The ascending surface 34 extends upwardly from the junction of surfaces 34 and 36 to the central island at an angle of from about 120 to about 130 degrees, more preferably about 125 degrees.

Figure 4:
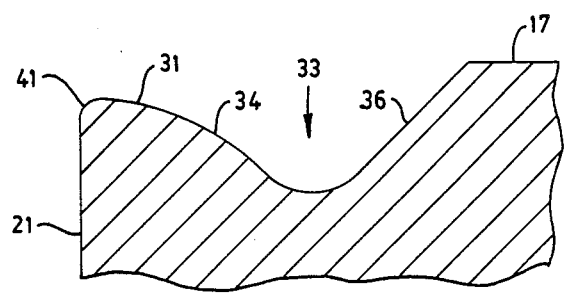
FIG. 4 is a detailed sectional view of a chip breaker similarly situated to the chip breaker shown in FIG. 2 but of another preferred embodiment.

According to a preferred embodiment illustrated in FIG. 4, the edge strengthening land 31 and the descending surface 34 extend rearwardly of the beveled edge a distance of from about 0.06 to about 0.07 inch. Land 31 and surface 34 are formed as part of convex curve which has a gradually increasing slope or a increasing angle with respect to side surface 21 moving inwardly away from the cutting edge 41 toward island 17. The edge strengthening land 31 extends rearwardly of the beveled edge a distance of from about 0.005 to about 0.015 inch, preferably about 0.01 inch and at an slope measured with respect to the island 17 of less then about 20 degrees, preferably less than about 15 degrees, with respect to the island 17. The descending surface 34 extends downwardly therefrom at a steeper slope in the range of less than about 40, and preferably less than about 30 degrees with respect to the island 17, more preferably at an angle of about 85 degrees. The ascending surface 34 extends upwardly from the junction of surfaces 34 and 36 to the central island at an angle of from about 120 to about 130 degrees, more preferably about 125 degrees. The chip breaker geometry illustrated in FIG. 4 showed a reasonable amount of wear after 14 to 17 minutes and showed no cracks or chipping and tests were stopped to conserve material.

Figure 5:
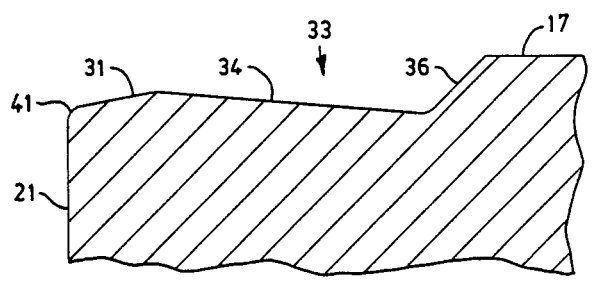
FIG. 5 is a detailed sectional view of a chip breaker similarly situated to the chip breaker shown in FIG. 2 but of another preferred embodiment.

According to a preferred embodiment illustrated in FIG. 5, the edge strengthening land extends rearwardly of the beveled edge a distance of from about 0.002 to about 0.006 inch, preferably about 0.004 inch, and at an angle of from about 105 to about 95 degrees, preferably about 100 degrees with respect to the peripheral side surface 22. The descending surface 34 extends downwardly from the strengthened edge 31 at an angle of from about 80 to about 86, preferably about 83 degrees with respect to the respective side surface 21. The ascending surface 34 extends upwardly to the central island 17 at an angle of from about 130 to about 140 degrees, and preferably at an angle of 135 degrees with respect to the side surface 21.

Figure 6:
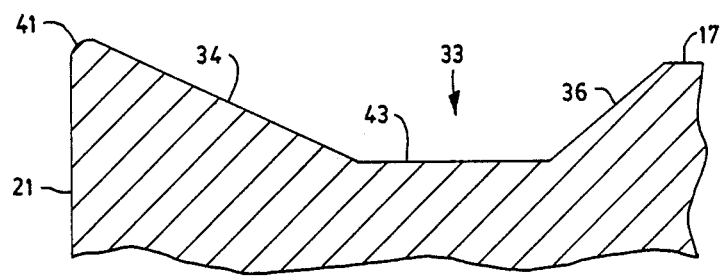
FIG. 6 is a detailed sectional view of a chip breaker similarly situated to the chip breaker shown in FIG. 2 but of another preferred embodiment where no edge strengthened land is provided for conditions of heavy depth.

In one embodiment illustrated in FIG. 6 the insert is intended for conditions of heavy depth of cut. Enhanced edge strength is sacrificed for a sharp cutting edge 41 in a positive rake insert. An edge strengthened land not provided. The descending surface 34 extends downwardly from the cutting edge 41 at an angle of from about 75 to about 85, preferably about 80 degrees with respect to the respective side surface 21 for a distance of from about 0.045 to about 0.055, and preferably about 0.05 inch from the side surface 21. A flat bottom surface 43 extends inwardly from the descending surface 34 to the ascending surface 36 a distance of from about 0.025 to about 0.035, preferably about 0.030 inch. The ascending surface 34 extends upwardly to the central island 17 at an angle of from about 130 to about 140 degrees, and preferably at an angle of 135 degrees with respect to the side surface 21.

While there have been shown and described what are at present believed to be the preferred embodiments of the present invention, it will be obvious to those of ordinary skill in the art that various changes and modifications may be made therein without departing from the spirit and scope of the invention as defined by the appended claims.

We claim:

1. A ceramic cutting insert comprising silicon nitride or alumina, said insert comprising a pair of substantially parallel spaced apart faces and at least one peripheral side surface, said peripheral side surface being substantially normal to said faces, a beveled cutting edge, said beveled edge has a radius of from about 0.002 to about 0.005 inch and being positioned in a cutting plane wherein said cutting plane is substantially parallel to said face and positioned closely adjacent or at the juncture of one of said faces and said peripheral side surface, an edge strengthening land extending rearwardly of the beveled edge a distance of from about 0.002 to about 0.006 inch and at an angle of from about 105 to about 95 degrees with respect to the peripheral side surface, and a grooved recess extending rearwardly and along said edge strengthening land, said grooved recess includes a shallow descending surface leading to the bottom of said grooved recess and an ascending surface leading to a respective one of said parallel faces and away from the insert and the cutting edge, said descending surface extends downwardly from the strengthened edge at an angle of from about 80 to about 86, said ascending surface extends upwardly at an angle of from about 130 to about 140 degrees to said side surface, said grooved recess including a lowermost position at the juncture of the descending and ascending surfaces, said lowermost portion being positioned rearwardly from the cutting edge a distance of from about 0.04 to about 0.08 inch.

* * * * *